United States Patent [19]
Sturm et al.

[11] 3,791,872
[45] Feb. 12, 1974

[54] METHOD FOR PRODUCTION OF ELECTRODE FOR ELECTROCHEMICAL CELLS

[75] Inventors: Ferdinand V. Sturm, Walter Naschwitz, both of Erlangen; Werner Rummel, Grossdechsendorf; Dieter Groppel, Erlangen, all of Germany

[73] Assignee: Siemens Aktiengesellschaft, Munich, Erlangen and Berlin, Germany

[22] Filed: June 30, 1971

[21] Appl. No.: 158,459

[30] Foreign Application Priority Data
July 1, 1970 Germany............................ 2032549

[52] U.S. Cl. ......................................... 136/120 FC
[51] Int. Cl. .......................................... H01m 13/04
[58] Field of Search ........ 136/120 FC; 264/46, 236; 136/120 FC

[56] References Cited
UNITED STATES PATENTS
3,480,538  11/1969  Sturm ............................ 136/120 FC
3,328,205  6/1967  Barber et al. .................. 136/120 FC FOREIGN PATENTS OR APPLICATIONS
1,213,472  11/1970  Great Britain ...................... 136/146
1,546,172  10/1968  France .............................. 136/146

Primary Examiner—L. Dewayne Rutledge
Assistant Examiner—M. J. Andrews
Attorney, Agent, or Firm—Curt M. Avery

[57] ABSTRACT

An electrode for electrochemical cells constituting a porous cover layer of fibrous material and a layer of pulverulent catalyst. The catalyst particles are connected with each other as well as with the cover layer by means of a binder. The cover layer contains a binder. A butadienestyrene acrylonitrile copolymer is present in the catalyst layer. Also described is a method for producing the electrode.

10 Claims, 2 Drawing Figures

METHOD FOR PRODUCTION OF ELECTRODE FOR ELECTROCHEMICAL CELLS

The present invention relates to an electrode for electromechanical cells constituting a porous cover layer of fibrous material and a layer of pulverulent catalyst. The catalyst particles are connected with each other as well as with the cover layer, by means of a binder. The invention also relates to a method for producing the electrode.

U. S. Pat. No. 3,471,336 to v. Sturm et al. describes an electrochemical cell with thin electrodes and a porous support structure arranged therebetween and containing an aqueous electrolyte. The active electrode in this cell consists essentially of pulverulent catalyst material, which is pressed against the support structure with a net or sieve having good electricity conducting properties. The support structure is flexible and contains, on at least one side, a cover layer which is gastight and ion-conductive, in a saturated state. By placing this cover layer between the pulverulent catalyst electrode and the support structure, the danger of gas escaping from the gas chamber of the electrode into the electrolyte, is prevented. The nets and sieves serve primarily for pressing the catalyst powder against the cover layer or the support structure.

When electrochemical cells are operated with such pulverulent catalyst electrodes, difficulties, which can be traced to the loose bearing of the catalyst powder to the cover layer, can occur. Thus, for example when the outer pressure relaxes, the pulverulent material may separate from the cover layer which may lead, during operation, to current interruptions in the separated regions. These difficulties are overcome, in accordance with v. Sturm U. S. Pat. No. 3,480,538, by bonding the pulverulent catalyst particles with one another and with the porous cover layer on the electrolyte side by means of a binder. Suitable materials for use as a binder are those which do not form a pore free film but a structure that is permeable to the electrolyte and to gas. For this reason, polyethylene powder, polytetrafluoroethylene powder, glass powder and plexiglass powder are used. The application of the pulverulent catalyst material upon the cover layer as well as the connection of the catalyst particles among each other is effected so that the electrode material is mixed with the binding agent and that this mixture is subsequently pressed upon the cover layer at elevated temperatures using a light pressure.

According to the above-mentioned patents, useful cover layers are, e.g., non-metallic plates such as asbestos paper or fiber glass, cellulose foils and their derivatives. However, these electrodes do not fully satisfy in all instances, either.

It is an object of the present invention to further improve an electrode for electrochemical cells constituting a porous cover layer of fibrous material and a layer of pulverulent catalyst, the catalyst particles being connected with each other and with the cover layer, by a binder.

To this end and in accordance with the present invention, the cover layer is also provided with a binder. The binder in the cover layer and in the catalyst layer is a butadienestyreneacrylonitrile copolymer.

Diaphragms or membranes for electrochemical cells of a fibrous material and a binder are known from French Pat. No. 1,546,172. (See also British Pat. No. 1,213,472.) The binders of such membranes are electrolyte resistant copolymers based on butadienestyreneacrylic acid, methacrylic acid, methacrylic acid ester and butadienestyreneacrylonitrile.

The use of a binder containing cover layer and the use of a butadienestyreneacrylonitrile copolymer serving as a binder in the cover layer as well as in the catalyst layer of the electrode according to the invention, which consists of both these layers, offers various advantages and considerable improvements. Above all it provides a particularly intimate connection between the catalyst and the cover layer and reliably insures that one layer will not peel off or separate from the other layer. The excellent adherence of the cover layer upon the catalyst layer, which is required for a perfect functioning of an electrochemical cell, such as a fuel cell where such an electrode is used, remains intact, over long periods of time, in the electrode of the invention.

Thus, for example, in an electrode according to the invention, the cover layer could not be pulled off the catalyst layer following a three month storage in 6 m KOH at room temperature and a subsequent four month storage in 6 m KOH at 60°C. These are typical conditions found, for example, in fuel cells which are operated with an alkali electrolyte. The attempt to separate the two layers finally led to a destruction of the cover layer. A portion of the cover layer was separated, while the remaining part remained attached to the catalyst layer. The tight connection between the catalyst layer and the cover layer can be clearly seen on the micrographs. Beyond this, electrodes according to the invention which had been tested under similar conditions, over several thousand hours, in half-cell operation, showed no decay manifestations. This shows that the use of a butadienestyreneacrylonitrile copolymer as a binding agent provides impeccable cover layers and catalyst layers wherein the binder produces no adverse effects. The electrical behavior is not influenced either. This is established by current-voltage curves, which will be described hereinbelow.

The fibrous material of the electrode according to the invention is preferably asbestos. The cover layer must be resistant to the electrolyte liquid being used so that the electrode is primarily employed in electrochemical cells with alkalitic electrolytes. However, when acid resistant asbestos material are used, the electrode of the invention may also be used in cells with acid electrolytes. The material for the cover layer may also be of fibers or webs of carbon or alkali poor inorganic glass, or synthetics such as polypropylene.

The synthetic binder provides the electrode with a partly hydrophobic character. However, since the electrode must be partially wetted with the electrolyte liquid during its operation in electrochemical cells, the nitrile groups of the copolymeride are preferably saponified into carboxyl groups in the electrode according to the invention. The possibility of hydrating these carboxyl groups lessens the hydrophobic character of the binder. In addition, a considerable increase of the mechanical stability of the cover layer can be obtained by increasing the content of the binder without entailing the possibility of simultaneously lowering the wettability. The copolymer being used has an acrylonitrile content of approximately 28 percent and hence, affords the opportunity of producing many hydratable groups in the electrode. The direct use of a butadienestyreneacrylic acid copolymer as a binder is not recommended since a suitable copolymer would have a low acrylic acid content and thus not enough hydratable groups. Copolymers with a high acrylic acid content, on the other hand, are not suitable as they are not resistant to alkalitic electrolytes, for example.

The method for producing the electrode according to the invention encompasses several steps. The production of a cover layer and, independent thereon, the preparation of a mixture of catalyst material and binder, the application of this mixture as a layer upon the cover layer and the pressing of both these layers, the cross-linking of the binder and, finally, the saponification of the nitrile groups of the binder into carboxyl groups.

The cover layer is produced in a manner whereby an aqueous dispersion of the butadienestyreneacrylonitrile copolymer is added, dropwise, into a suspension of the fibrous material in water, under vigorous stirring. The mixture is then further processed in an appropriate device, for example, a sheet former and the water is removed. Finally, the material is dried and densified, for example, in a calender. The mixture of catalyst material and binder is prepared, independently of the preparation of the cover layer. To this end, the moistened catalyst powder is mixed with the aqueous dispersion of the butadienestyreneacrylonitrile copolymeride until a homogenous mixture results. Subsequently, the water is either completely or partially removed from the catalyst binder suspension. The mixture obtained as a result is applied as a layer upon the cover layer and both layers are pressed.

The application may be effected by brushing the catalyst binder mixture onto the cover layer, into a matrix. It is also preferable to add substances which act as lubricants to the aqueous suspension which contains the catalyst powder and the binder. This makes it possible to roll out the catalyst binder mixture into a layer, prior to its application upon the cover layer. This provides a homogenous distribution of the catalyst material and a uniform porosity. The rolled out layer is then placed upon the cover layer and pressed with the same.

The lubricant may, for example, be polytetrafluoroethylene, which is added in form of an aqueous suspension to the catalyst binder suspension. It is recommended to use lubricants which may be dissolved, out of the electrode, by water, following its production. This makes it possible to utilize the advantages provided by the lubricant while avoiding additional hydrophobic substances, in the finished electrode. Such watersoluble lubricants, are, for example, polyglycols, preferably those with a high molecular weight.

Fillers may also be preferably added to the catalyst binder suspension such as pulverized, soluble salts, for example, ammonium oxalate, potassium oxalate and potassium carbonate. This assures, the desired pore structure, primarily in ductile catalyst materials, during rolling.

After the catalyst binder mixture is applied upon the cover layer and pressed therewith, the butadienestyreneacrylonitrile copolymer which is present as a binder in both layers, is cross-linked. The cross-linking is effected through a thermal processing by applying a light pressure. It is accelerated by peroxides which are already contained in the binder. This cross-linking reinforces the adherence of the catalyst layer to the cover layer and increases the wet strenght of the cover layer.

Following the cross-linking process, the nitrile groups of the binder are saponified into carboxyl groups by treatment with potassium hydroxide thereby creating the hydratable groups in the electrode.

Surprisingly, it was discovered that the electrode according to the invention has the described favorable effects even when the cross-linking of the copolymer present in the cover and catalyst layers, is effected separately. To this end, the copolymer contained in the cover layer is cross-linked immediately following the fashioning of the cover layer while the copolymer in the catalyst layer is cross-linked following the pressing of the catalyst layer and the cover layer.

In this embodiment of the present invention, the saponification of the nitrile groups of the binder also is preferably carried out separately. The saponification of the nitrile groups of the copolymer in the cover layer is effected immediately following the cross-linking of the copolymer so that completely finished cover layers are used during the production of the electrodes, i.e., cover layers wherein the binder is already cross-linked and saponified.

The invention will be explained in greater detail with reference to several embodiment and the drawing, wherein.

EXAMPLE 1

Raney nickel with a grain size <100 $\mu$ was ultimately mixed with an aqueous dispersion of a butadienestyreneacrylonitrile copolymer (approximately 28 percent acrylonitrile content in the copolymer) which contains 2 percent by weight dry substance with respect to the catalyst material. Thereafter, water was partly removed from the thus obtained suspension. The moist mixture was brushed into a matrix, upon a binder containing cover layer of asbestos which was prepared according to Example 7, and was pressed for a short period with 200 kp/cm$^2$. The copolymer in both layers of the electrode was thereafter cross-linked at 80°C for 15 hours, using a light pressure of about 1 to 5 kp/cm$^2$. Subsequently, the nitrile groups of the binder in both layers were saponified within 15 minutes by treating at room temperature, with 1.5 percent KOH lye.

Figure 1:
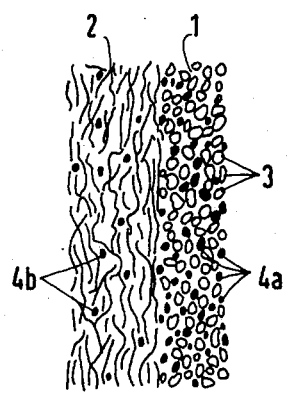
FIG. 1 is a cross-section through an electrode of the present invention.

The schematic drawing of FIG. 1 shows the cross-section through the electrode produced. In this figure, the catalyst layer is at 1, the cover layer of a fibrous material at 2, the catalyst particles are at 3, the binder in the catalyst layer at 4a and the binder in the cover layer at 4b.

EXAMPLE 2

The catalyst binder suspension of Example 1 was completely dried at 60°C. The copolymer was not cross-linked thereby. The dried mixture was again homogenized in a mixer, brushed upon a moistened cover layer and pressed with 200 kp/cm$^2$. The employed cover layer was produced as in Example 7. Thereafter, the binder of the cover layer was cross-linked at 80°C for 15 hours by applying a pressure of about 5 kp/cm$^2$. Finally, the nitrile groups were saponified within 15 minutes, at room temperature with 1.5% KOH. Following the pressing of the cover and the catalyst layers, the binder, in the catalyst layer, was cross-linked as in Example 1 and saponified.

EXAMPLE 3

An electrode is produced as in Example 1 or 2, by using Raney silver with a grain size < 100 μ and 2 percent by weight binder.

EXAMPLE 4

68 g catalyst powder (Raney nickel or Raney silver) and 30 g ammonium oxalate (grain size 50 to 40 μ) were compounded with an aqueous binder dispersion which contains 2 g butadienestyreneacrylonitrile copolymer. The thus obtained mixture was processed as in Examples 1 to 2, into an electrode, together with a cover layer. Following the production of the electrode, the filler was eliminated with water or potassium hydroxide.

Figure 2:
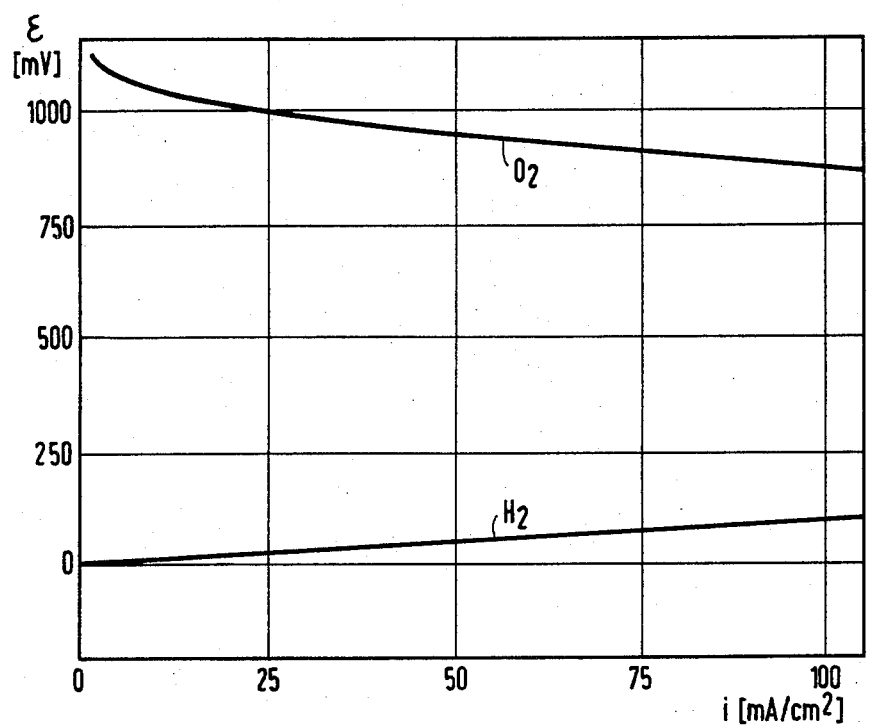
FIG. 2 is current voltage curves of two electrodes.

Two current voltage curves, which are plotted at the thus produced electrodes are graphically illustrated in FIG. 2. The potential $\epsilon$ is plotted in mV on the ordinate. The applied current is plotted in mA/cm$^2$ on the abscissa. The electrodes, i.e., the catalyst and the cover layers togehter, were 1.4 mm thick. The electrode area was 12.5 cm$^2$. The potential of the electrodes were measured at room temperature in 6 m KOH at a pressure of the reaction gas of 1.7 atm. against the hydrogen potential in the same solution. The oxygen electrode O$_2$, with a coating of 0.3 g Raney silver/cm$^2$, was produced with 2 percent by weight butadienestyreneacrylonitrile copolymer and 20 percent by weight ammonium oxalate as a filler, at an applied pressure of 300 kp/cm$^2$. The Raney nickel used as a catalyst in the hydrogen electrode H$_2$ was oxidized prior to the production of the electride with H$_2$O$_2$ and tempered in a hydrogen current. This electrode had a coating of 0.4 g Raney nickel/cm$^2$. It contained 2 percent by weight binder and was produced with an applied pressure of 400 kp/cm$^2$.

EXAMPLE 5

93 g catalyst powder (Raney nickel or Raney silver) and 5 g high molecular polyglycol, serving as lubricant, were intimately mixed with an aqueous dispersion of 2 g butadienestyreneacrylonitrile copolymer, dired at 60°C, homogenized and rolled out to form a catalyst layer. This layer was placed upon a moistened cover layer, which had been produced as in Example 2 and the two were pressed with 100 kp/cm$^2$. Subsequently, cross-linking and saponifying were effected as in Example 1 and the lubricant is then eliminated by treating with water.

EXAMPLE 6

96 g catalyst powder (Raney nickel or Raney silver) was intimately mixed with an aqueous suspension of 2 g polytetrafluoroethylene as a lubricant and an aqueous dispersion of 2 g butadienestyreneacrylonitrile copolymer.

After being completely dry and homogenized, the mixture was rolled out thereby being strengthened. Further processing is effected as in Example 1. When the catalyst material is ductile, a previous impregnation of the catalyst powder is recommended. To this end, we used an aqueous solution of a salt, e.g. 1 g K$_2$CO$_3$/100 g catalyst. Lubricants and binders may be present in the mixture in the amount of 1 to 10 percent by weight relative to the catalyst powder. A content of 2 percent by weight is, however, preferable.

EXAMPLE 7

A cover layer was produced, for example, according to French Pat. No. 1,546,172. Thus, for producing a cover layer of asbestos, an aqueous dispersion of a butadienestyreneacrylonitrile copolymer, added under heavy stirring, to a suspension of pure asbestos fibers, in water. The binder was thereby absorbed on the fibers. The mixture was then further processed in a suitable device, for example, a "sheet former" and the water was removed. The material was finally dried and densified in a calender.

Similar suitable cover layers may be produced by using other fibrous materials, for example, glass or synthetic fibers.

The electrodes according to the present invention, comprising a catalyst layer and a cover layer firmly connected therewith, can preferably be used for the production of double action or two-faced and bipolar electrodes. To this end, a compact component is first of all produced by pressing a contact net into the side of the catalyst layer which is not connected with the cover layer. Each two such components can be united, via a gas conductor layer, e.g., a net, to form double action electrodes, the so-called "Janus electrodes." A bipolar electrode is obtained through a gas tight separation within the gas conducting layer, e.g. with the aid of a nickel foil.

Due to its flexibility, the electrode of the invention may be advantageously installed into fuel cell batteries which are produced according to casting technology, i.e., according to a method wherein the outside of the individual components are cast with a resin and connected therewith.

We claim:

1. The method of producing an electrode for an electrochemical cell which comprises:
   a. adding an aqueous dispersion of a butadienestyreneacrylonitrile copolymer to a suspension of fibrous material in water, separating the water, drying and densifying the fibrous material thereby to form a cover layer of the fibrous material;
   b. adding catalyst powder to an aqueous dispersion of a butadienestyreneacrylonitrile copolymer to form a suspension of the catalyst in the copolymer dispersion, the amount of the copolymer being between 1 and 10 percent by weight of the catalyst, homogenizing and removing the water from the suspension thereby to form a mixture of the catalyst and the copolymer;
   c. placing a layer of the mixture of b) upon the cover layer and pressing both layers together;
   d. cross-linking the butadienestyreneacrylonitrile copolymer; and
   e. saponifying the nitrile groups of the butadienestyreneacrylonitrile copolymer into carboxyl groups thereby to impart a hydrophilic character to the copolymer.

2. The method of claim 1, wherein the fibrous material of the cover layer is asbestos.

3. The method of claim 1, wherein a filler is added to the suspension and is leached out following the production of the electrode.

4. The method of claim 1, wherein the butadienestyreneacrylonitrile copolymer present in the cover layer, is cross-linked together with the copolymer which is contained in the catalyst layer.

5. The method of claim 1, wherein the nitrile groups present in the copolymer of catalyst layer and cover layer are saponified together to form carboxyl groups.

6. The method of claim 1, wherein the amount of the copolymer in the mixture of the catalyst and the copolymer is 2 percent by weight of the catalyst.

7. The method of claim 1, wherein a lubricant is added to the suspension.

8. The method of claim 7, wherein, following the production of the electrode, the lubricant is leached out by water.

9. The method of claim 1, wherein the butadienes-tyreneacrylonitrile copolymer contained in the cover layer is cross-linked per se immediately following the production of the cover layer.

10. The method of claim 9, wherein the nitrile groups present in the copolymer of the cover layer are saponified into carboxyl groups, following the cross-linking of the copolymer of the cover layer.

* * * * *